(12) United States Patent
Martínez Fonseca

(10) Patent No.: US 12,138,604 B2
(45) Date of Patent: Nov. 12, 2024

(54) DEVICE FOR THE GASIFICATION, PUMPING AND MIXING OF FLUIDS

(71) Applicant: Julián Martínez Fonseca, Tijuana (MX)

(72) Inventor: Julián Martínez Fonseca, Tijuana (MX)

(*) Notice: Subject to any disclaimer, the term of this patent is extended or adjusted under 35 U.S.C. 154(b) by 474 days.

(21) Appl. No.: 17/630,570

(22) PCT Filed: Nov. 20, 2020

(86) PCT No.: PCT/MX2020/050043
§ 371 (c)(1),
(2) Date: Jan. 27, 2022

(87) PCT Pub. No.: WO2021/101362
PCT Pub. Date: May 27, 2021

(65) Prior Publication Data
US 2022/0258111 A1    Aug. 18, 2022

(30) Foreign Application Priority Data
Nov. 22, 2019   (MX) .................. MX/a/2019/013931

(51) Int. Cl.
*B01F 25/64*    (2022.01)
*B01D 47/16*    (2006.01)

(52) U.S. Cl.
CPC .............. *B01F 25/64* (2022.01); *B01D 47/16* (2013.01)

(58) Field of Classification Search
CPC ................. B01F 25/64; B01D 47/16

USPC ...................................... 261/87, 93
See application file for complete search history.

(56) References Cited

U.S. PATENT DOCUMENTS

| | | | |
|---|---|---|---|
| 3,630,498 A | 12/1971 | Bielinski | |
| 4,066,382 A | 1/1978 | Lakin et al. | |
| 4,193,949 A * | 3/1980 | Naito | C02F 3/205 210/219 |
| 4,228,112 A * | 10/1980 | Hise | C02F 3/205 261/87 |
| 4,341,641 A * | 7/1982 | Novak | C02F 1/78 210/765 |
| 5,013,490 A * | 5/1991 | Tanimoto | B01F 23/2368 261/87 |
| 5,213,718 A | 5/1993 | Burgess | |
| 5,660,766 A * | 8/1997 | Van Dyk | C02F 3/205 261/87 |
| 6,386,751 B1 | 5/2002 | Wootan et al. | |

(Continued)

FOREIGN PATENT DOCUMENTS

| CN | 103016396 A | 4/2013 |
|---|---|---|
| CN | 206951021 U | 2/2018 |

(Continued)

*Primary Examiner* — Charles S Bushey
(74) *Attorney, Agent, or Firm* — Emerson, Thomson & Bennett, LLC; Roger D. Emerson; Peter R. Detorre

(57) ABSTRACT

A fluid gasification, pumping and mixing equipment, for fluids contained in open or closed bodies, which allows to control the bubble size and the proportion of mixed gases, of a gas flow to be diffused into the fluid, which functions to generate a gas suction flow that allows active filling of cavitation zones created by the radial movement of a cavitation propeller, which can be used to suction at different depths without losing suction force or generate higher energy consumption.

9 Claims, 5 Drawing Sheets

(56) References Cited

U.S. PATENT DOCUMENTS

| | | |
|---|---|---|
| 6,627,784 B2 | 9/2003 | Hudson et al. |
| 6,712,980 B1 * | 3/2004 | Ahlstrom ............ B01F 23/2331 |
| | | 261/87 |
| 6,884,353 B2 | 4/2005 | Hoage et al. |
| 7,178,975 B2 | 2/2007 | Kozyuk |
| 7,507,014 B1 | 3/2009 | League et al. |
| 7,784,769 B2 * | 8/2010 | Hoefken ............ B01F 23/23421 |
| | | 210/150 |
| 7,833,421 B2 | 11/2010 | Huymann |
| 8,268,136 B2 | 9/2012 | McCutchen et al. |
| 8,329,043 B2 | 12/2012 | Poeschl |
| 8,491,777 B2 | 7/2013 | Hassan et al. |
| 8,771,499 B2 | 7/2014 | McCutchen et al. |
| 9,062,263 B2 | 6/2015 | Sevastyanov |
| 10,202,288 B2 | 2/2019 | Sirok et al. |
| 2006/0180949 A1 | 8/2006 | Beusekom et al. |
| 2013/0270478 A1 | 10/2013 | Wood et al. |
| 2014/0316180 A1 | 10/2014 | Fomitchev-Zamlov |
| 2015/0328603 A1 | 11/2015 | Smith et al. |
| 2015/0328604 A1 | 11/2015 | Smith |
| 2016/0185624 A1 | 6/2016 | Miller et al. |
| 2017/0129833 A1 | 5/2017 | Hassan et al. |

FOREIGN PATENT DOCUMENTS

| | | |
|---|---|---|
| RU | 2166987 C1 | 5/2001 |
| RU | 2357791 C1 | 6/2009 |
| RU | 2393391 C1 | 6/2010 |
| RU | 2433873 C1 | 11/2011 |
| RU | 2438769 C1 | 1/2012 |
| RU | 2594425 C1 | 8/2016 |

\* cited by examiner

DEVICE FOR THE GASIFICATION, PUMPING AND MIXING OF FLUIDS

FIELD OF INVENTION

The present invention refers to an equipment that allows gasifying, pumping and mixing fluids based on the cavitation principle, which allows the active diffusion of gases within fluids contained in a closed container or in open bodies and more particularly, it refers to a fluid gasification, pumping and mixing equipment by fed cavitation, with structures to diffuse micro and nano bubbles of a gas flow, towards vacuum zones created by the controlled cavitation in the periphery of an impeller arranged to allow the filling of the vacuoles created by the impeller, in which pressures lower than atmospheric are generated causing self-suction to injection point, allowing a continuous gas flow, thus favoring the exchange of gases towards the fluid, as well as the displacement of the gasified fluid generated by pumping it, whose flow can be sucked from high depths to be gasified.

BACKGROUND OF THE INVENTION

The fluid pumping, mixing and gasification have been carried out for different processes in various ways throughout history, such as the aeration of water bodies intended for breeding of aquatic species, the gasification of beverages, the mixing of immiscible phases, the chemical compounds synthesis, and so on. For this, a great variety of devices have been used that perform at least one or more of the aforementioned functions; however, one of the main problems these devices face is energy efficiency due to the volume pumped, mixed and/or gassed, which is inversely proportional to the depth to which the device is subjected in the fluid to be processed, so that at great depths conventional equipment cannot efficiently carry out any of the aforementioned processes due to the increase in pressure in the deep zone of the fluid.

Another problem with current devices is the amount of energy required to generate a stable bubble size at micro or nano levels, since high input speeds and high pressures are required to generate a stable bubble size. In typical bubble generation processes designed to gasify a fluid, the bubbles are pressurized, which can produce undesirable effects, since the increase in gas pressure to be injected into the fluid generates bubbles of different sizes depending on the depth which the equipment works. In general, the elements used to create very small size bubbles are sintered or porous materials, which makes them very prone to clogging, resulting in a low level of reliability and high maintenance costs. To this must be added the fact that current devices do not allow the size of the gasification bubble to be modulated in a controlled manner when it is injected into the fluid, since its size is subject to the pore opening of the sintered or porous materials.

Another limitation of the currently available equipment is the lack of means to strategically control the position and depth levels of the fluid suction point to carry out mixing and/or gasification, therefore, lacking this function, the gasification process of the available devices is limited only to the fluid volume that is over the bubbles action zone.

To overcome the limitations of the equipment intended for pumping, mixing, and gasifying conventional fluids, gasifying equipment have been developed such as the equipment described in U.S. Pat. No. 4,066,382A, which disclosed an impeller for liquids aeration, which comprises a support central disk with a plurality of impeller blades, having a cover that creates an opening on the surface of the disc for air intake. The arrangement of the impeller blades follows a radial pattern with curved blades that leaves a free central zone for gas aspiration. However, the fluid aeration is restricted only to the fluid surface, since the impeller only generates gas suction at shallow depth, so that said equipment cannot be used to gasify deep layers of fluid. Furthermore, due to the configuration of the blades, it is not possible to control the gas bubbles size to be diffused in the fluid, so the gas transfer rate to fluid is very small.

Patent Application US20060180949A1 describes aeration equipment comprising a suction tube with an aeration propeller located near its lower end, a motor at its upper end and a transmission shaft that connects the impeller to motor. The equipment is used for wastewater aeration during biological treatment processes. Said equipment shows the use of a conduction pipe with an internal propeller located near its lower end that sucks gases from the surface to inject them into a mixing chamber where they are diffused into the fluid. However, due to the type of propeller used, the gas mixing flow is turbulent, so it is not possible to control the bubble size created. Also, due to the configuration of the equipment, it significantly decreases its suction force at great depths, so that the gas suction stops when the water column in the central suction tube is very high.

Patent U.S. Pat. No. 6,884,353B2 protects an aeration apparatus, comprising a rotating impeller that generates microbubbles at reduced pressure. Said apparatus comprises an upper chamber that is filled with air through the displacement of a fluid contained within it, caused by the suction produced by the movement of the lower impeller, in such a way that when the air chamber is empty, the gas enters the impeller blades and is directed through micro-perforations made in the surfaces of the impeller blades towards the fluid, actively entering the air. However, because the aeration chamber must be completely emptied of the fluid for the aeration process to begin, the equipment is intended to be used only in the fluid surface zones. Also, because the gas bubbles are generated towards the lower end of the impeller, they diffuse only to a small depth so that the low substrates of the fluid do not contact with the gas bubbles.

Patent U.S. Pat. No. 5,213,718A describes an aerator to gasify water bodies, which is constituted by a centrifugal pump with an impeller modified to generate a cavitation zone that sucks a gas flow through an inlet tube whose outlet is located above the water level. In said patent, the cavitation zone is generated in the upper region of the equipment impeller, so the gas mixture flow is turbulent. However, due to the aerator impeller configuration, a lot of suction power is lost at great depths, so the incoming gas flow decreases significantly with depth. In addition, the gas bubbles size generated is not constant due to the turbulent flow created in the impeller cavitation zone.

Patent U.S. Pat. No. 3,630,498A discloses a gasifier equipment for liquids comprising a hollow shaft with a lower blade impeller having a porous surface that allows the diffusion of bubbles of a pressurized gas in the vicinity of the blades. In said equipment, the gas bubbles generated facilitate the rise of the liquid towards the equipment outlet and improve the gas diffusion. However, due to the presence of porous surface, it is necessary to include equipment that injects gas at high pressure, since the porous surface of the propeller blades generates a significant resistance that prevents the gas active diffusion.

None of the above equipment allows precise control of the size of the gas bubble to be diffused in the fluid, much less allow the generation of gas bubbles on micro and nano scale.

Additionally, none of the equipment described above can work at different depth levels without significant losses in the equipment suction force.

In view of the above problems, there is a need to provide fluid gasification, pumping and mixing equipment that allows the precise control of the gas bubbles size to be diffused in the fluid, to improve the gas retention times to allow better diffusion. Also, there is a need to provide a gasifier equipment that can work at different depths without losing the suction force and preserving its ability to control the gas bubbles size to be diffused in the fluid.

SUMMARY OF THE INVENTION

To overcome the limitations of existing gasification equipment on the market, the present invention aims to provide a fluid gasification, pumping and mixing equipment that can suck fluids to be gasified from any depth without suffering power losses.

Another object of the present invention is to provide fluid gasification, pumping and mixing equipment that allows controlling the gas bubbles size injected into the fluid.

A further object of the present invention is to provide fluid gasification, pumping and mixing equipment with means for the diffusion of two or more different gases into one or more fluids.

Another additional object of the present invention is to provide fluid gasification, pumping and mixing equipment that allows to gasify fluids with gas flows at atmospheric pressure regardless of the working depth.

The above, as well as other, objects and advantages of the present invention will become apparent from the following detailed description thereof.

DESCRIPTION OF THE FIGURES OF THE INVENTION

DETAILED DESCRIPTION OF THE INVENTION

Figure 1:
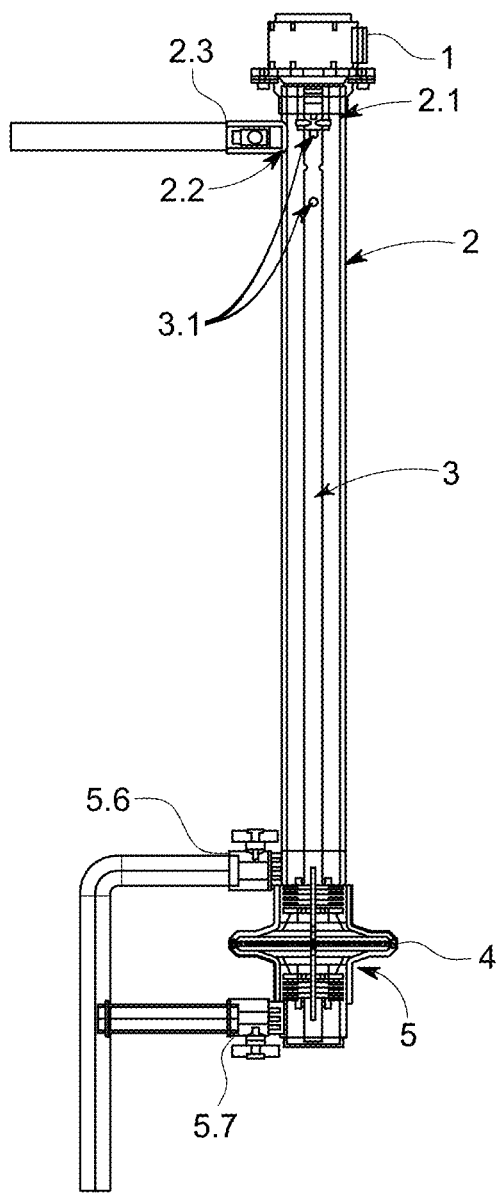
FIG. 1 shows a side view of the fluid gasification, pumping and mixing equipment of the present invention.
Figure 2:
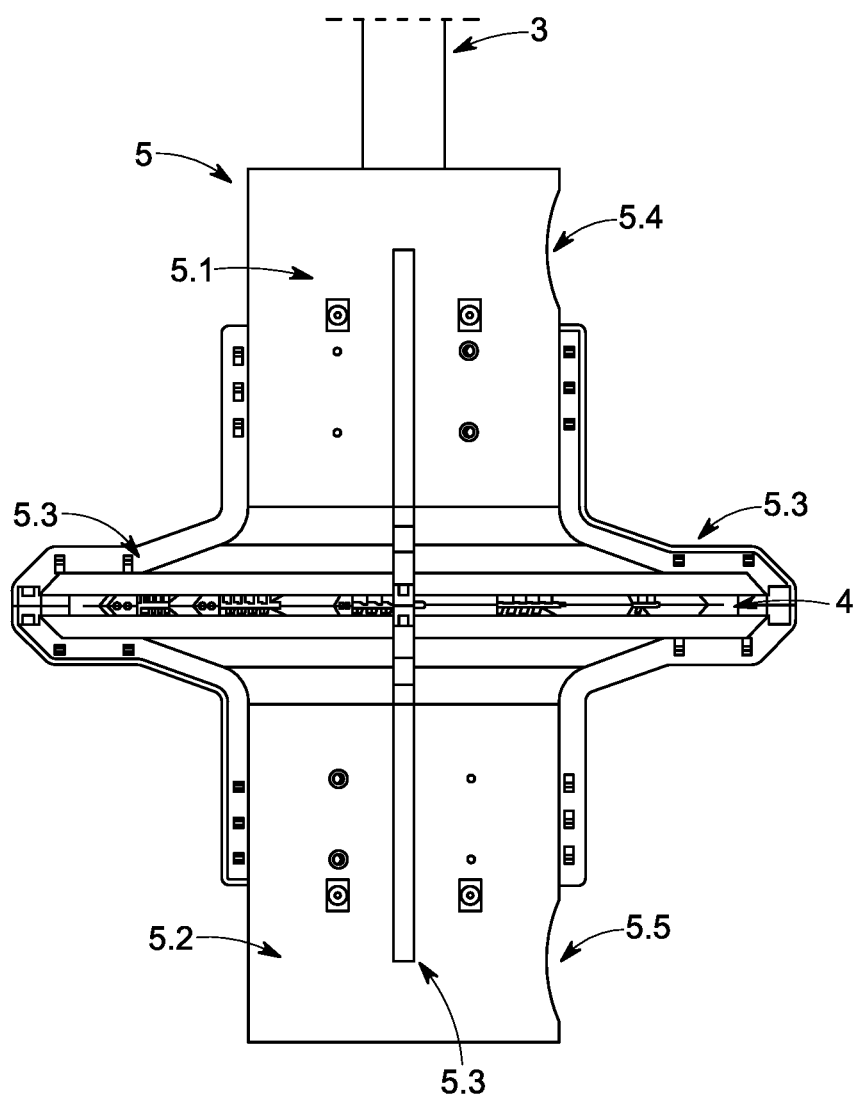
FIG. 2 shows a side view of the aeration chamber (5).
Figure 3:
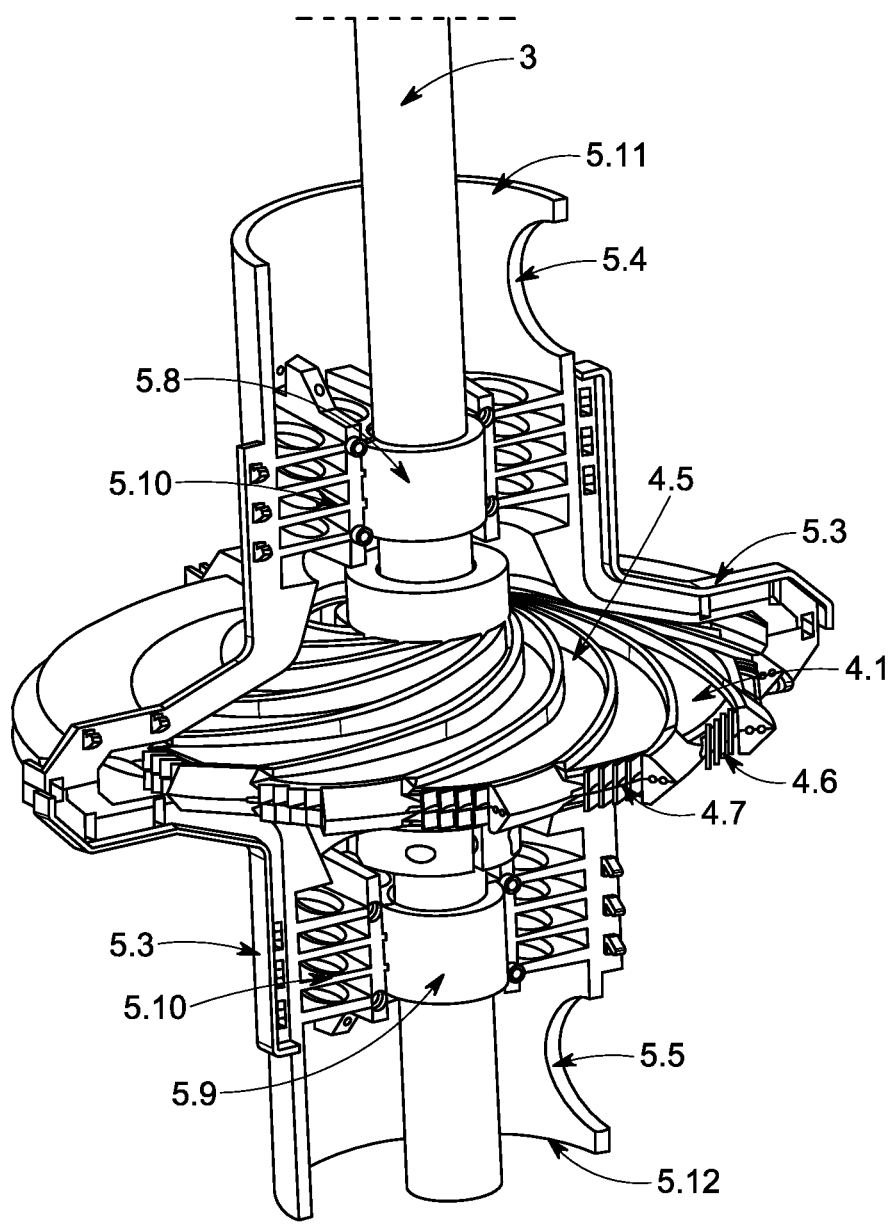
FIG. 3 shows a perspective view of the lateral section of the aeration chamber (5).
Figure 4:
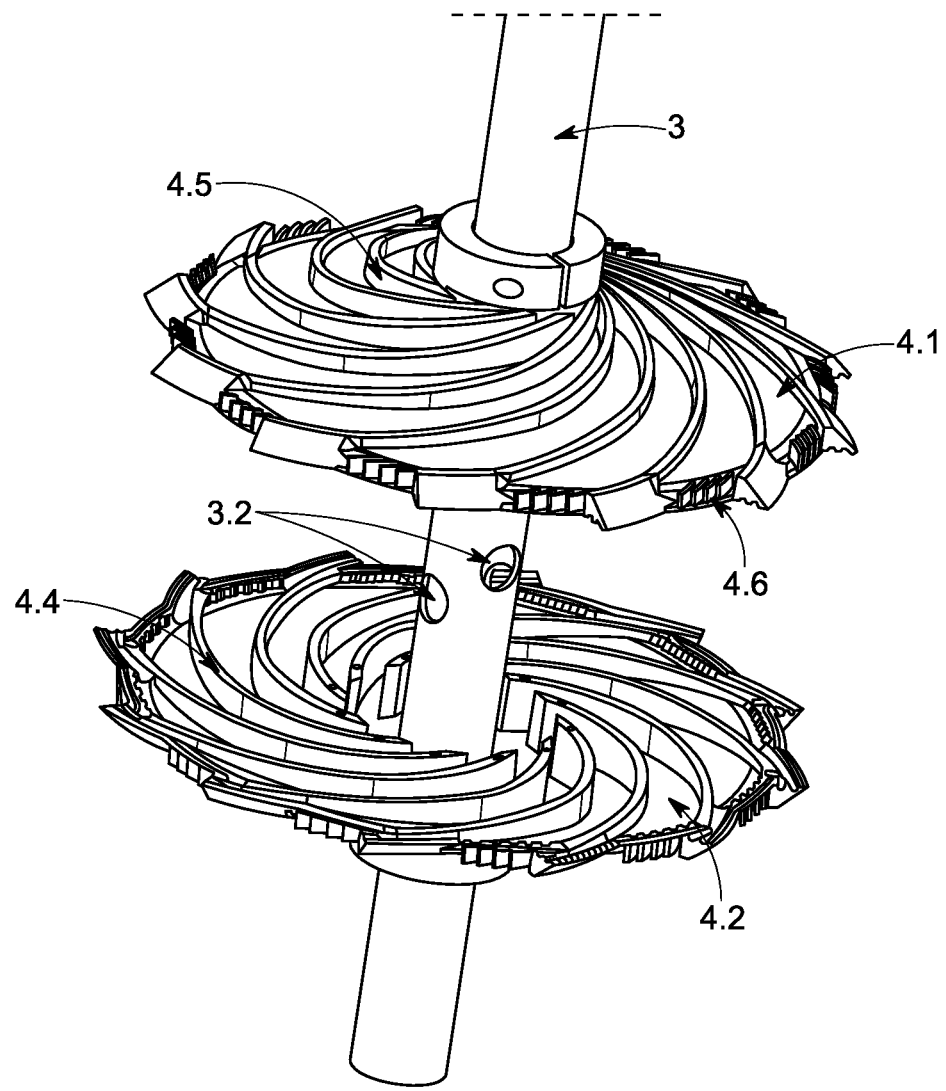
FIG. 4 shows a close-up of the fed cavitation device (4), with the first and second discs (4.1 and 4.2) separated to show their internal structures.
Figure 5:
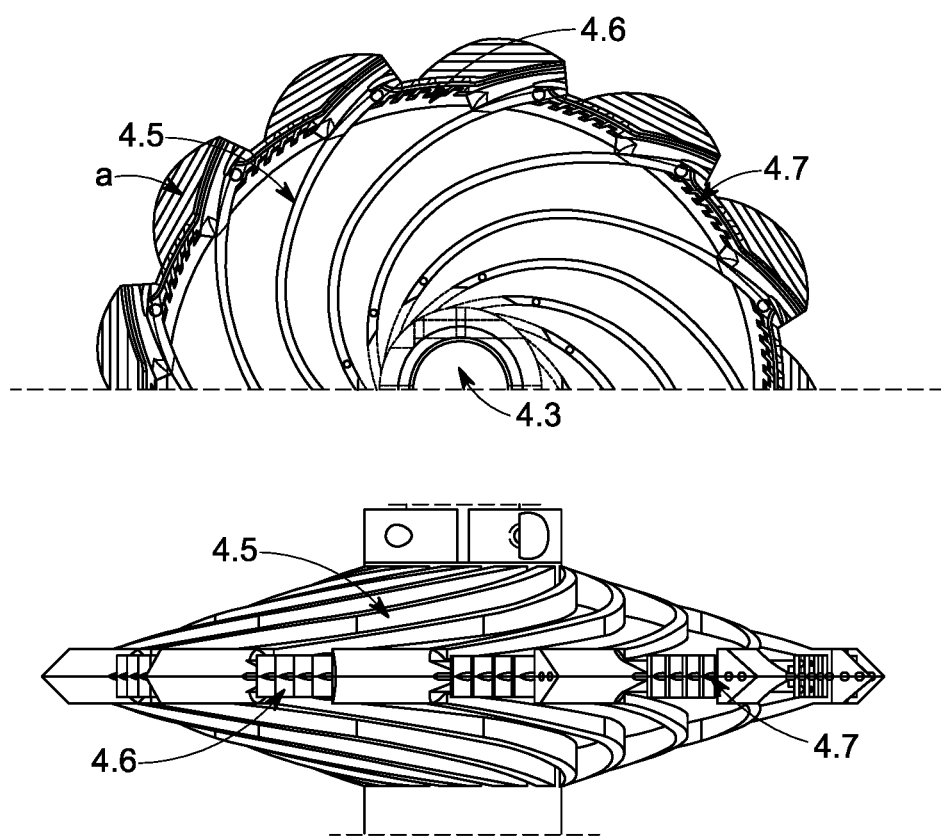
FIG. 5 shows a top view and a side view of the fed cavitation device (4) in which its external structures are observed.

The present invention provides a fluid gasification, pumping and mixing equipment, for free or confined fluids, which can be used at different depths without losing suction force, therefore it has the ability to pump gasified fluid mixtures to almost unlimited depths with the same energy efficiency as it would at very shallow levels, and which also allows controlling the gas bubbles size to be diffused in the fluid, with the unique characteristic of allowing efficient fluid gasification at atmospheric pressure levels.

To achieve the above, the fluid gasification, pumping and mixing equipment of the present invention is composed of a rotary actuator (1), an outer conduit (2), a hollow rotary shaft (3), a fed cavitation device (4), and an aeration chamber (5). These components, as well as their function, will be described in detail below:

Rotary Actuator

The rotary actuator (1) is the element that generates the mechanical force that operates the gasifier equipment of the present invention. Said rotary actuator (1) can be selected from an electric motor, an internal combustion engine or a turbine. The rotary actuator (1) has an output shaft that protrudes from its main body and can optionally be coupled to a transmission casing such as for example a gear box to modify the shaft output torque. Likewise, said rotary actuator comprises a speed selector mechanism (not shown) that allows to increase or decrease the number of revolutions per minute (RPM) at which it works, in such a way that the gasifier equipment can be operated at different working speeds.

Outer Conduit

The outer conduit (2) acts as a vertical structural support for the equipment and is made up of at least one cylindrical section; a rotary actuator connection (2.1), which couples and gives mechanical support the rotary actuator (1) in a watertight manner; at least one gas connection (2.2), located in the upper of the outer conduit (2), through which a flow of gas or gases from for example a compressor, a pipeline or pressurized tanks is fed; at least one gas regulation valve (2.3), which conducts and regulates the flow of gas or gases from the at least one gas connection (2.2), said at least one gas regulation valve (2.3) being restricted and regulated to establish a specific gas-fluid relationship, to regulate the size of the bubble generated by the equipment.

Hollow Rotary Shaft

The hollow rotary shaft (3) is arranged inside the outer conduit (2) and is connected to the output shaft of the rotary actuator (1). Said hollow rotary shaft (3) comprises at least one inlet orifice (3.1) located in its upper for the gas flow entry from the outer conduit (2), and at least one outlet orifice (3.2) located in its lower.

Fed Cavitation Device

The fed cavitation device (4) is made up of a first and a second disc (4.1 and 4.2), with flat or substantially conical faces, which are connected to each other by their internal face. The first and second discs (4.1 and 4.2) each comprise a central orifice (4.3) through which the hollow rotary shaft (3) passes, engaging to transmit the movement of said hollow rotary shaft (3) towards said first and second discs (4.1 and 4.2); a plurality of internal spiral blades (4.4) that start from the central orifice (4.3) forming a Fibonacci spiral and end on the external perimeter of the first and second disc (4.1 and 4.2) in such a way that said internal spiral blades (4.4) form an internal turbine that increases the impulse and speed of the gases coming from the at least one outlet orifice (3.2) of the hollow rotary shaft (3), towards a vacuum zone; a plurality of external spiral blades (4.5) located on the external face of the first and second discs (4.1 and 4.2), in the same relative positions with respect to the plurality of internal spiral lades (4.4), arranged to drive the fluid along the internal faces of the aeration chamber (5), which creates a fluid flow with a path parallel to the horizontal plane of the fed cavitation device (4); a plurality of mini hydro-ailerons (4.6) located at the terminal ends of each of the external spiral blades (4.5) that generate with their radial displacement, controlled cavitation zones (a) along a path perpendicular to the fluid flow, in which micro or nano vacuum bubbles are formed that collide with the fluid driven by the plurality of external spiral blades (4.5), generating a spreading of the fluid mixed with the micro or nano gas bubbles and; plurality of outlet orifices (4.7) arranged in the plurality of mini hydro-ailerons (4.6), which connect the internal turbine formed by the plurality of internal spiral blades (4.4), with the outer perimeter of the first and second discs (4.1 and 4.2), in such a way that said plurality of outlet orifices (4.7) allow the gas flow to exit towards the controlled cavitation zones (a) feeding the micro or nano vacuum bubbles, in such a way that are created micro or nano gas bubbles.

In a preferred embodiment of the present invention, the plurality of external spiral blades (4.5), preferably 12-20 external spiral blades, are separated from each other on the periphery, between 20-60 mm distance at their distal end and, have a slope between 0-45 degrees with respect to the horizontal, and each of the terminal ends of the external spiral blades (4.5) comprises between 3-10 mini hydro-ailerons (4.6), which have a curved geometry that follows the Fibonacci spiral.

Aeration Chamber (5)

The aeration chamber (5) has housed inside, at least one fed cavitation device (4) and comprises a first and a second casing (5.1 and 5.2) that may have a shape selected from flat shape at their base or a substantially conical shape depending on the geometry of the at least one fed cavitation device (4), which together with the fed cavitation device (4) form the water flow conduits towards the vacuum zone, being the distance between the fed cavitation device and the casing internal walls (5.1 and 5.2), the minimum necessary to avoid friction. Said first and second casings (5.1 and 5.2) are connected to each other by their larger diameter openings, by means of four ribs (5.3), in such a way that four expulsion cavities are formed between said first and second casings (5.1 and 5.2), through which the fluid flow is expelled together with the created micro or nano gas bubbles; a first and a second cylindrical shape suction inlets (5.4 and 5.5), arranged on the sides of the first and second casings (5.1 and 5.2) respectively, for the connection of suction intakes (5.6 and 5.7) through which fluid is sucked in; a pair of support bearings (5.8 and 5.9) attached to the inside of the casings (5.1 and 5.2) by means of a plurality of ribs with perforations (5.10), which allow free flow of fluids, designed to support the hollow rotary shaft (3) and; a first and a second orifices (5.11 and 5.12) located on the upper faces of the first and second casings (5.1 and 5.2) respectively, the first orifice (5.11) being connected to the outer conduit (2), sealing the lower end of said outer conduit (2) to allow the fluid suction from the first suction inlet (5.4), while the second orifice (5.12) is sealed with a cap to allow the fluid suction from the second suction inlet (5.5).

In operation, the fluid gasification, pumping and mixing equipment of the present invention generates a central suction flow through the hollow rotary shaft (3), which actively sucks the gas flow towards the gas flow channels formed by the plurality of internal spiral blades (4.4) of the fed cavitation device (4), which exits through the plurality of outlet orifices (4.7) by the suction created by the cavitation zones generated by the movement of the plurality of mini hydro-ailerons (4.6), thus filling the vacuum bubbles (vacuoles) created by cavitation. Because the cavitation zone is generated only in the proximity of the plurality of outlet orifices (4.7), the vacuum zone creates a barrier and at the same time a gate, between the device internal part and the external hydrostatic pressure generated by the fluid, allowing the entry of gases with low pressure towards the high hydrostatic pressure zone (depending on the depth). This vacuum zone receives the hydraulic impact of the fluid that is sucked through the same zone and additionally propelled by the external spiral blades (4.5) generating a spreading and evolution of the bubbles created in said zone to give cavity to the following bubbles allowing the next cycle of bubble radial ejection. In addition, since the fluid flow created by the plurality of external spiral blades (4.5) is directed directly to cavitation zones, the contact of the bubbles with the generated flow is significantly improved without reducing the suction force of the equipment. Furthermore, due to the previously exposed equipment configuration, it is possible to control the bubble size generated by regulating the gas flow volume admitted through the control valve (2.3), the fluid volume admitted to aeration chamber (5) and the rotational speed of the fed cavitation device (4).

In a preferred embodiment of the present invention, the gasification equipment is a floating equipment with autonomous means for generating energy. In this embodiment, the equipment also includes a floating base that provides enough buoyancy to support the equipment full weight. Said floating base has arranged in its upper region a solar panel, which generates electrical energy that is supplied to a battery that is used to power the rotary actuator (1), in such a way that the equipment can be used for the aeration of open ponds.

In a further embodiment of the present invention, the gasifier equipment comprises a plurality of aeration chambers (5) that house the same number of fed cavitation devices (4), said aeration chambers (5) being vertically stacked in the end of the hollow rotary shaft (3), so that the equipment mixing rate is increased.

The invention claimed is:

1. A fluid gasification, pumping and mixing equipment for fluids, characterized in that it comprises:
    a rotary actuator (1) with an output shaft and a speed selector mechanism to control the number of revolutions per minute (RPM) at which said rotary actuator (1) operates;
    an outer conduit (2), which has a reception enclosure (2.1), arranged at an upper end, adapted to receive the rotary actuator (1) in a sealed manner, and one or more gas inlets (2.2) located below the reception enclosure (2.1), with a control valve (2.3) to control a gas flow or control a gas mixture proportion entering inside the outer conduit (2);
    a hollow rotary shaft (3) located inside the outer conduit (2) and connected to the output shaft of the rotary actuator (1), which has at least one inlet orifice (3.1) located near an upper end of the hollow rotary shaft for the entry of the gas flow from the outer conduit (2), and at least one outlet orifice (3.2) located near a lower end of the hollow rotary shaft to allow the gas flow to exit;
    at least one fed cavitation device (4), with first and second discs (4.1 and 4.2) with flat or substantially conical faces, the discs located adjacent each other and connected to each other by adjacent internal faces; each of which has a central orifice (4.3) through which the hollow rotary shaft (3) passes through a coupling to transmit the movement of said hollow rotary shaft (3) towards said first and second discs (4.1 and 4.2); a plurality of internal spiral blades (4.4) that form an internal impeller or turbine, which start from the central orifice (4.3) and end on the external perimeter of the first and second discs (4.1 and 4.2), in such a way that it forms a plurality of channels that drive the gas flow from the at least one outlet orifice (3.2) of the hollow rotary shaft (3); a plurality of external spiral blades (4.5) located on external faces of the first and second discs (4.1 and 4.2), in the same relative positions with respect to the plurality of internal spiral blades (4.4) arranged to drive the fluid to internal faces of an aeration chamber (5) containing the first and second discs, creating a fluid flow with a path parallel to a horizontal plane of the at least one fed cavitation device (4); a plurality of mini hydro-ailerons (4.6) located at the terminal ends of each of the external spiral blades (4.5), to generate controlled cavitation zones (a) along a path perpendicular to the fluid flow, in which micro or nano vacuum bubbles are formed and; a plurality of outlet orifices (4.7) arranged in the plurality of mini hydro-ailerons (4.6), which connect the gas flow channels formed by the plurality of internal spiral blades (4.4) with the controlled cavitation zones (a) generated on the outer perimeter of the first and second discs (4.1 and 4.2), in such a way that said plurality of outlet orifices (4.7) allow the gas flow to exit towards the controlled cavitation zones (a) feeding the formed micro or nano vacuum bubbles, in such a way that micro or nano gas bubbles are created and;

the aeration chamber (5) in which the at least one fed cavitation device (4) is housed, having a first and a second casing (5.1 and 5.2) that can have a shape selected from a flat shape in their base or a substantially conical shape depending on the geometry of the at least one fed cavitation device (4), and are connected to each other by their larger diameter openings, by means of four ribs (5.3), in such a way that four expulsion cavities are formed between said first and second casings (5.1 and 5.2) through which the fluid flow is expelled together with the created micro or nano gas bubbles; first and second suction inlets (5.4 and 5.5) of cylindrical shape, arranged on the first and second casings (5.1 and 5.2) respectively, with inlet orifices for the connection of suction intakes (5.6 and 5.7) through which the fluid is sucked; a pair of support bearings (5.8 and 5.9) held in the casing internal part (5.1 and 5.2) by means of a plurality of ribs with perforations (5.10) that allow free flow of fluids, designed to support the rotating shaft hollow (3) and; first and second orifices (5.11 and 5.12) located on upper and lower faces of the first and second casings (5.1 and 5.2) respectively, the first orifice (5.11) being connected to the outer conduit (2), sealing the lower end of said outer conduit (2) to allow the fluid suction from the first suction inlet (5.4), while the second orifice (5.12) is sealed with a cap to allow the fluid suction from the second suction inlet (5.5).

2. The fluid gasification, pumping and mixing equipment according to claim 1, wherein the rotary actuator (1) is selected from the group consisting of an electric motor, an internal combustion engine and a turbine.

3. The fluid gasification, pumping and mixing equipment according to claim 1, wherein the output shaft of the rotary actuator (1) is coupled to a transmission casing with a secondary output shaft, and the hollow rotary shaft (3) is connected at its upper end to the secondary output shaft of the transmission casing to modify its output torque.

4. The fluid gasification, pumping and mixing equipment according to claim 1, wherein the plurality of mini-hydro-ailerons (4.6) comprises between 3-10 mini-hydro-ailerons (4.6) in each one of the terminal ends of the external spiral blades (4.5).

5. The fluid gasification, pumping and mixing equipment according to claim 1, wherein the plurality of external spiral blades (4.5) comprises between 12-20 external spiral blades (4.5).

6. The fluid gasification, pumping and mixing equipment according to claim 5, wherein the plurality of external spiral blades (4.5) are separated from each other by a distance between 20-60 mm at their distal end.

7. The fluid gasification, pumping and mixing equipment according to claim 5, wherein the plurality of external spiral blades (4.5) have a slope of between 0-45 degrees.

8. The fluid gasification, pumping and mixing equipment according to claim 1, further comprising a floating base to provide sufficient buoyancy and support the weight of the equipment, which has a solar panel arranged in its upper region to generate electrical energy that is supplied to a battery that is used to power the rotary actuator (1).

9. The fluid gasification, pumping and mixing equipment according to claim 1, further comprising a plurality of aeration chambers (5) that house the same amount of fed cavitation devices (4), said aeration chambers (5) vertically stacked near the lower end of the hollow rotary shaft (3).

* * * * *